United States Patent
Aringsmann et al.

(10) Patent No.: US 10,569,637 B2
(45) Date of Patent: Feb. 25, 2020

(54) DRIVE SYSTEM FOR A HYBRID VEHICLE

(71) Applicant: Bayerische Motoren Werke Aktiengesellschaft, Munich (DE)

(72) Inventors: Dirk Aringsmann, Holzkirchen (DE); Daniel Mooz, Bad Camberg (DE); Klaus Kalmbach, Moessingen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 264 days.

(21) Appl. No.: 15/668,433

(22) Filed: Aug. 3, 2017

(65) Prior Publication Data

US 2017/0326962 A1 Nov. 16, 2017

Related U.S. Application Data

(63) Continuation of application No. PCT/EP2016/050905, filed on Jan. 18, 2016.

(30) Foreign Application Priority Data

Feb. 4, 2015 (DE) .......... 10 2015 201 931

(51) Int. Cl.
*B60K 6/387* (2007.10)
*B60K 6/40* (2007.10)
(Continued)

(52) U.S. Cl.
CPC .......... *B60K 6/387* (2013.01); *B60K 6/40* (2013.01); *F16D 11/14* (2013.01); *F16D 13/34* (2013.01);
(Continued)

(58) Field of Classification Search
CPC . B60K 6/387; B60K 6/40; B60K 6/48; B60K 2006/4825; F16D 11/14;
(Continued)

(56) References Cited

U.S. PATENT DOCUMENTS 5,022,039 A * 6/1991 Karube .......... F04D 29/059
372/58
5,691,588 A 11/1997 Lutz et al.
(Continued)

FOREIGN PATENT DOCUMENTS

DE 43 23 602 A1 1/1995
DE 199 01 052 A1 7/2000
(Continued)

OTHER PUBLICATIONS

Chinese Office Action issued in Chinese counterpart application No. 201680003643.9 dated Nov. 2, 2018, with English translation (Fourteen (14) pages).
(Continued)

*Primary Examiner* — Huan Le
(74) *Attorney, Agent, or Firm* — Crowell & Moring LLP

(57) ABSTRACT

A drive system for a hybrid vehicle having an internal combustion engine includes an electric motor and a clutch device which has a frictional locking element and a positive locking element that is connected parallel to the frictional locking element. The clutch device is configured to couple the internal combustion engine into the drive system and to be switched into at least the following states: a) open positive locking element and closed frictional locking element when starting and/or synchronization of the internal combustion engine, b) closed positive locking element and closed frictional locking element or closed positive locking element and open frictional locking element when the internal combustion engine is running and synchronized such that an internal combustion engine drive output action is generated, and c) open positive locking element and open frictional locking element when the internal combustion engine is stopped such that purely electric motor drive of the vehicle is provided.

17 Claims, 2 Drawing Sheets

(51) Int. Cl.
  *F16D 11/14* (2006.01)
  *F16D 23/04* (2006.01)
  *F16D 25/08* (2006.01)
  *F16D 13/34* (2006.01)
  *F16D 11/00* (2006.01)

(52) U.S. Cl.
  CPC ........... *F16D 23/04* (2013.01); *F16D 25/082* (2013.01); *F16D 2011/006* (2013.01)

(58) Field of Classification Search
  CPC .......... F16D 13/24; F16D 13/34; F16D 23/04; F16D 25/082
  See application file for complete search history.

(56) References Cited

U.S. PATENT DOCUMENTS

| 8,777,806 | B2 | 7/2014 | Birkhold et al. | |
| 2013/0072347 | A1* | 3/2013 | Birkhold | B60K 6/387 477/5 |
| 2014/0080664 | A1 | 3/2014 | Hartz et al. | |

FOREIGN PATENT DOCUMENTS

| DE | 100 18 926 A1 | 11/2000 |
| DE | 10 2007 010 307 B3 | 6/2008 |
| DE | 10 2007 050 235 A1 | 4/2009 |
| DE | 10 2009 045 562 A1 | 4/2011 |
| DE | 10 2011 078 110 A1 | 12/2012 |
| DE | 10 2011 053 832 A1 | 3/2013 |

OTHER PUBLICATIONS

PCT/EP2016/050905, International Search Report dated Mar. 22, 2016 (Three (3) pages).

German Search Report issued in German counterpart application No. 10 2015 201 931.4 dated Oct. 6, 2015, with Statement of Relevancy (Six (6) pages).

Chinese Office Action issued in Chinese counterpart application No. 201680003643.9 dated Jul. 2, 2019, with English translation (Eight (8) pages).

* cited by examiner

DRIVE SYSTEM FOR A HYBRID VEHICLE

CROSS REFERENCE TO RELATED APPLICATIONS

This application is a continuation of PCT International Application No. PCT/EP2016/050905, filed Jan. 18, 2016, which claims priority under 35 U.S.C. § 119 from German Patent Application No. 10 2015 201 931.4, filed Feb. 4, 2015, the entire disclosures of which are herein expressly incorporated by reference.

BACKGROUND AND SUMMARY OF THE INVENTION

The present invention relates to a drive system for a hybrid vehicle. A hybrid vehicle is hereinafter to be understood to mean a motor vehicle which has a drive system with at least one electric motor and at least one internal combustion engine for driving the hybrid vehicle. Depending on the concept, it is possible here for the hybrid vehicle to be driven, in phases, by the electric motor or internal combustion engine alone or by both together, wherein a clutch device is provided for coupling the internal combustion engine into the drive system.

Clutches are widely used for separating the internal combustion engine in terms of drive from the drive system or coupling in the torque of said internal combustion engine for drive purposes. Friction clutches, for example, are used for this purpose. Owing to the high torque to be transmitted, the friction clutches in such applications generally run in oil. This offers inter alia the advantage of a good dissipation of the generated friction heat from the clutch, in order that said clutch can, in the required power spectrum, be of compact design, in particular with regard to its outer diameter. Here, systems which run in oil duly permit a good dissipation of heat, but require the interaction with systems for oil transportation and oil storage. Furthermore, there is a possible system-related energy requirement owing to splashing losses of moving parts in oil and the energy consumption of an oil pump and friction losses at an oil turbine.

DE 10 2007 010307 B3 discloses a shift clutch arrangement for countershaft transmissions in motor vehicles for rotationally conjointly connecting a shaft to a rotary element mounted thereon, the shift clutch arrangement having a shift sleeve, which is connected rotationally conjointly to the shaft, mounted so as to be axially displaceable relative to the shaft and equipped with a first toothing, having a clutch body, which is connected rotationally conjointly to a rotary element and which is equipped with a second toothing which can be placed in engagement with the first toothing for the rotationally conjoined connection of shaft and rotary element, and having a blocking-synchronizing device, which has a synchronizing ring with a friction surface by means of which the rotational speed of the shaft and of the rotary element can be synchronized before the first and the second toothing are placed in engagement, wherein the blocking-synchronizing device furthermore has a blocking element which is coupled to the shift sleeve by a detent engagement means and which is coupled to the synchronizing ring in a direction of rotation by means of a blocking surface pairing, wherein the blocking surface pairing is formed between the blocking element and a synchronizing element which is coupled in an axial direction to the blocking element and in the direction of rotation to the synchronizing ring.

For the starting of the internal combustion engine, use is generally made of special electric starter motors.

According to one aspect of the present invention, a drive system for a hybrid vehicle has an internal combustion engine, an electric motor, and a clutch device which has a frictional locking element and a positive locking element which is connected in parallel with respect to the frictional locking element. The clutch device is designed to couple the internal combustion engine into the drive system and can be switched into at least the following states: open positive locking element and closed frictional locking element for the starting and/or synchronization of the internal combustion engine; closed positive locking element and closed frictional locking element or closed positive locking element and open frictional locking element when the internal combustion engine is running and synchronized, for the purposes of generating an internal combustion engine drive output action; and open positive locking element and open frictional locking element when the internal combustion engine is stopped, for the purposes of realizing purely electric motor drive of the vehicle.

The drive system thus has an electric motor and an internal combustion engine which are designed for driving the hybrid vehicle. The drive system may however also drive the hybrid vehicle exclusively by means of the electric motor or the internal combustion engine. For example, the hybrid vehicle may be driven by means of the electric motor in the case of a low demand for drive power, in the case of short demanded travelling ranges, during urban driving or the like. The internal combustion engine may be decoupled by means of the clutch device, and shut down, for this operating mode. In the decoupled state of the internal combustion engine, a drive-output shaft of the internal combustion engine can, with regard to rotational speed and torque, rotate substantially without being influenced by the rotational speed and the torque of a drive-output shaft for transmitting the torque of the electric motor and the internal combustion engine. If the drive power of the internal combustion engine is required, for example for acceleration or for driving at high speeds, the internal combustion engine can be started and coupled in. The drive system can make do without a separate electric starter motor for the internal combustion engine. The internal combustion engine can thus be started by means of the electric motor. To start the internal combustion engine, or to synchronize the internal combustion engine with the required rotational speed during ongoing operation of the drive system, a frictional locking element is provided which permits the transmission of a torque from the electric motor to the internal combustion engine in a flexible manner in terms of rotational speed. When the internal combustion engine has started, its drive torque can be utilized for driving the hybrid vehicle. To keep the frictional locking element compact, it is designed more for the starting and synchronization of the internal combustion engine than for the permanent transmission of the full potential drive torque of the internal combustion engine. Therefore, in the drive system, a positive locking element is provided so as to be connected in parallel with respect to the frictional locking element, such that the drive power of the internal combustion engine can also be transmitted by the positive locking element. The frictional locking element and the positive locking element are accordingly arranged so as to be connected in parallel in terms of transmission technology as regards their transmission of torque. When the internal combustion engine has been started and synchronized, the positive locking element, for example a toothing or interlocking means or any other suitable means, can be closed, such that the torque of the internal combustion engine can then be transmitted initially in parallel by the positive locking element and the frictional locking element. The frictional locking element may finally also be relieved of load or opened, such that then, the torque of the internal combustion engine is transmitted only via the positive locking element. This saves energy for the clutch actuator arrangement, because the latter is inactive in this state.

The invention is based on the principle of using frictional locking to produce synchronous running between components with an (initial) relative rotational speed. When synchronous running has been achieved, the positive locking element, in particular a toothing, can engage and thus produce a positive locking action, whereby the full torque can be transmitted in positively locking fashion. The principle of the synchronization is utilized here to satisfy the demands with regard to the cranking-start capability, and the positive locking is utilized to transmit the full torque of the internal combustion engine. Here, the full torque for the cranking start should remain relatively low in order that the friction pairing does not have to be correspondingly designed for the full torque. As soon as positive locking has been produced in the clutch device, the full torque potential of the internal combustion engine can be utilized by means of the positive locking element.

The relatively low demands with regard to torque transmission by means of the frictional locking element owing to the fact that the torque of the running internal combustion engine is transmitted by means of the positive locking element permits a more compact design of the frictional locking element and of the clutch device overall. The "X-dimension chain" can thereby be reduced, inter alia by virtue of the fact that the clutch device can be dimensioned to be so compact that it can be positioned within a rotor carrier of the electric motor. Furthermore, owing to the fact that the clutch device is split up by being divided into a compact frictional locking element and positive locking element, the introduction of energy from the clutch device into the region of the electric motor can be reduced, which permits greater flexibility with regard to the structural design. Owing to the optimum utilization of the available structural space, the implementation of additional system functions, such as for example rotor cooling at the electric motor based on a water-cooled housing web is also possible radially and axially.

In one advantageous refinement, the clutch is of dry design, that is to say has no oil immersion bath. By means of this design, it is possible for splashing losses that would arise during the movement of components in the oil and the associated friction to be avoided. Furthermore, the drive energy for an associated oil pump can be saved. The efficiency of the drive system can be improved in this way. Owing to the transmission of the torque of the internal combustion engine during driving operation by means of the positive locking element, the frictional locking element can also be designed to be advantageously compact, without the provision of an oil bath with the heat dissipation realized in that case by means of the oil.

In one embodiment, a part of a rotor of the electric motor is thus indirectly water-cooled. The positive locking element provided in the drive system for the purposes of transmitting the torque of the internal combustion engine permits a compact design of the frictional locking element, which only needs to be designed to transmit the relatively low cranking torque for the starting of the internal combustion engine. The structural space that is thereby freed up can be utilized for the provision of additional functions of the drive system. For example, indirect rotor cooling, in particular based on a water-cooled housing web, can be provided. The water cooling permits a particularly compact design, because the level of heat transfer to the fluid is high. Spatially large cooling ribs, which are widely provided in the case of an air-cooling arrangement, can be omitted, which contributes to further compactness of the system and an inexpensive construction.

In a further advantageous refinement, the clutch device runs at least partially within a rotor of the electric motor, or is even arranged therein. The term "rotor" is also to be understood here as including a rotor carrier. In this way, the extent of the drive system in the direction of the axis of the rotor can be reduced. The "X-dimension chain" relating to the drive system can be reduced, which is advantageous with regard to small dimensions of the drive system and the structural space requirement thereof.

In a further advantageous refinement, the frictional locking element is formed with a first rotary clutch element and a second rotary clutch element which are arranged coaxially with respect to one another and which are provided so as to be displaceable toward one another and away from one another, wherein the first clutch element has an outer cone and the second clutch element has an inner cone, which outer cone and inner cone can be placed in contact with one another for the purposes of transmitting torque.

Below, to improve the flow of the text, in some instances the first rotary clutch element will be referred to as first clutch element, and the second rotary clutch element will be referred to as second clutch element.

If the first clutch element and the second clutch element are spaced apart from one another, the frictional locking for transmission of a torque is eliminated. If the first clutch element and the second clutch element are in contact, a torque can be transmitted between the two by frictional locking. The more intensely the two clutch elements are pressed against one another, for example by means of a corresponding actuator, the higher is the torque that can be transmitted in frictionally locking fashion. Here, the conical design makes it possible for the friction area between the two clutch elements to be increased for a given diameter, which is advantageous with regard to a reduction of structural space and a low inertia with regard to the dynamic system behavior. Furthermore, in this way, the pressing forces between the clutch elements can, correspondingly to the gradient angle of the outer cone and inner cone, be increased beyond the pressure force of the actuator. The design of the clutch elements with an inner cone and outer cone as a friction pairing furthermore makes it possible to realize a small clutch diameter in relation to a construction with friction surfaces of circular-disk-like form, which is advantageous with regard to a compact design of the drive system. The first rotary clutch element can be coupled to a shaft for the purposes of transmitting the torque of the internal combustion engine and the electric motor.

A toothing may be provided on the first rotary clutch element or on the second rotary clutch element, and a pawl may be provided, so as to be assigned rotationally conjointly to the respective other clutch element, for engaging with arresting action in the toothing. It is thus possible for positive locking to be realized between the first rotary clutch element and the second rotary clutch element. The positive locking is preferably formed when the two clutch elements have substantially synchronized in order to minimize wear to the friction surfaces of the synchronization unit, in particular to the toothing and to the pawl, and to prevent undesired slippage. The synchronization may be realized by way of the transmission of torque by means of the inner cone and outer cone. If the positively locking connection between the first rotary clutch element and the second rotary clutch element is formed directly, or a positively locking connection of the second rotary clutch element to a shaft for transmitting the torque of the electric motor and the internal combustion engine, the positively locking connection and frictionally locking connection of the two clutch elements are connected in parallel. It is now possible, for example, for the frictionally locking connection to be released by moving the inner cone away from the outer cone or by means of a suitable clutch, and an associated actuator can then be relieved of load. The deactivation of the actuator makes it possible to realize energy savings. A further advantage of the drive system can be realized if the positively locking connection is designed for higher torques to be transmitted than the frictionally locking connection. For example, the frictionally locking connection may be used for the starting of the internal combustion engine of the hybrid vehicle. When the internal combustion engine has been started, the positively locking connection can be produced, and the relatively high torques that arise during the operation of the internal combustion engine can then be transmitted by the positively locking connection. This makes it possible for the frictionally locking connection to be designed to be compact, so as to be designed only for the low torque that arises during the starting of the internal combustion engine. The structural space can thereby be reduced, and the costs of the drive system of the hybrid vehicle can be lowered.

In a further advantageous refinement, the pawl is arranged so as to be displaceable axially parallel with respect to the rotary clutch elements. In this way, the action of centrifugal forces, which result from the rotation of the clutch elements, on the position of the pawl can be minimized, which facilitates the engagement thereof with arresting action in one position and the displaceability thereof.

In a further advantageous refinement, an actuator is provided which is designed to press the first clutch element and the second clutch element against one another. In this way, it is possible for a second actuator for the release of the first clutch element from the second clutch element, which second actuator counteracts the first actuator, to be dispensed with, if an active separation of the two clutch elements is desired and is not realized simply by means of a restoring spring. By means of the corresponding geometry, for example the angle of the bevel on the first or second clutch element, the required actuator force can be reduced to a minimum. The reduction of the required actuator force and also the reduction of the required structural space for the clutch device lead to a great amount of freedom with regard to the actuator selection.

In a further advantageous refinement, the actuator is designed to also pull the first clutch element and the second clutch element apart from one another. This serves for the separation of the clutch elements. It is likewise possible for the clutch elements to be moved apart from one another by means of a spring or the like acting counter to the actuator, if the actuator does not force the clutch elements together, or forces the clutch elements together with a force below a particular force value. For the movement of the clutch elements apart, it is likewise possible for a second actuator to be provided which acts counter to the first actuator.

In a further advantageous refinement, the actuator is designed as an electromotive actuator or as a hydraulic actuator. A hydraulic design makes it possible to realize particularly high actuation forces. By means of an electromechanical design, it is possible for high dynamics with regard to fast actuation behavior to be realized in a particularly effective manner. In the case of the electromechanical design, an electric motor with a suitable transmission may be provided for converting the rotational movement of the electric motor into a linear actuation movement. Furthermore, a design of the actuator as a pneumatically operating actuator is possible, which can offer advantages with regard to a technically very simple construction.

In a further advantageous refinement, the pawl is provided so as to engage with detent action in the presence of a defined force of the actuator or defined axial force of the first rotary clutch element or of the second rotary clutch element. A design of the pawl capable of engaging with detent action offers the advantage that the actuation force of the actuator can be reduced, or even set to zero, wherein the two clutch elements remain engaged with detent action in the presence of frictional locking. Owing to the relatively low resulting load on the actuator, said actuator can thus be designed to be more compact, that is to say more space-saving, of lower power and of lower cost. Altogether, in this way, the energy consumption of the actuator is reduced. Furthermore, the operational reliability of the drive system is increased.

For example, a spring element, in particular a spring ring, is provided which, in the event of the defined axial force being exceeded, is displaced by a bevel on the first rotary clutch element or second rotary clutch element such that the pawl can assume a detent engagement position. The spring element has, for example, spring-mounted pins or a spring ring. In the case of the embodiment as a spring ring, the latter may be pushed elastically into a shaft groove which receives said spring ring. Here, the pawl is jointly displaced by means of the spring element. The refinements and advantages discussed above with regard to a device according to the invention are also applicable to a method according to the invention.

According to one aspect of the invention, a method for driving a hybrid vehicle utilizing a drive system according to the invention has the steps of driving the hybrid vehicle by means of the electric motor, with transmission of the torque of the electric motor; driving the hybrid vehicle by means of the electric motor and simultaneously starting the internal combustion engine, with transmission of the torque by means of frictional locking by means of the frictional locking element; and driving the hybrid vehicle by means of the electric motor and internal combustion engine, with transmission of the torque of the internal combustion engine by means of positive locking by means of the positive locking element.

In a further advantageous refinement, in method step (b), an at least temporary increase in torque of the electric motor is performed. Here, the torque of the electric motor at its drive output shaft is, at the nominal point, increased above the nominal torque by an amount of for example 20 to 70 percent for a short duration of for example 0.5 to 3 seconds. By means of a relatively short duration combined with a relatively small increase in torque, the temperature of the electric motor can remain in the non-critical range, such that the electric motor does not sustain damage.

Further possible implementations of the invention also comprise combinations, which are not explicitly mentioned, of features described above or below with regard to the exemplary embodiments. Here, a person skilled in the art will also add individual aspects as improvements or enhancements to the respective basic form of the drive system.

Below, the invention will be discussed in more detail on the basis of preferred embodiments with reference to the appended figures. In the figures, the same reference designations are used to denote identical or functionally identical components unless stated otherwise.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
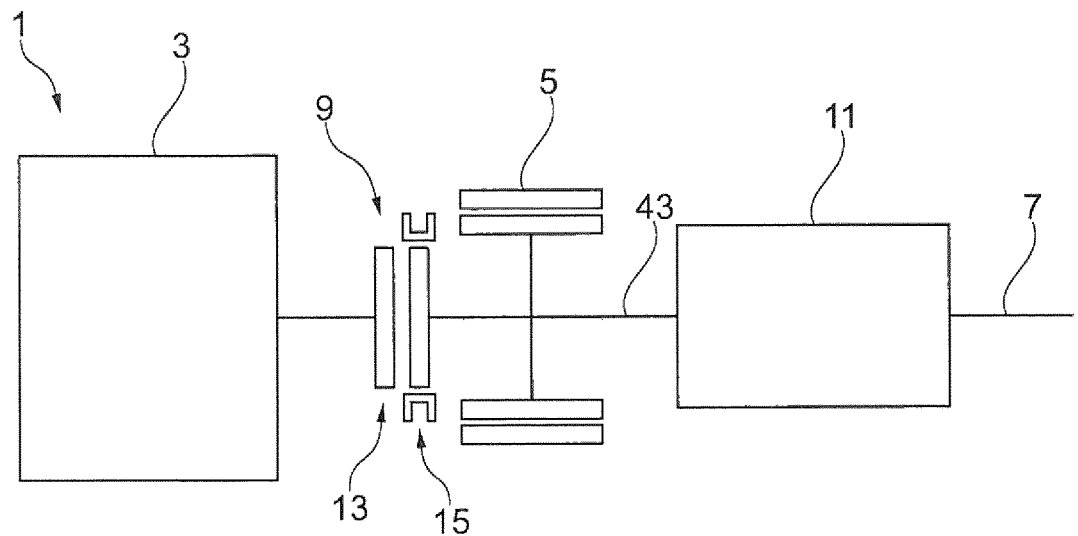
FIG. 1 shows a drive system for a hybrid vehicle according to a first exemplary embodiment in a schematic illustration.

FIG. 1 shows a drive system 1 for a hybrid vehicle according to a first exemplary embodiment in a schematic illustration. In this exemplary embodiment, the drive system 1 has an internal combustion engine 3 and an electric motor 5, which in the figure are both illustrated schematically as rectangles. In the context of the present invention, it is possible for more than one internal combustion engine 3 and one electric motor 5 to be provided in the drive system 1. The internal combustion engine 3 and the electric motor 5 are designed to provide their torques, for the purposes of driving the hybrid vehicle, to a drive output shaft 7 illustrated as a line on the right in the figure. A clutch device 9 is provided in the drive system 1 so as to be interconnected between the internal combustion engine 3 and the electric motor 5, such that said clutch device permits decoupling, in terms of rotation and torque, of the drive output shaft of the internal combustion engine 3 from the electric motor 5 and the drive output shaft 7.

In this exemplary embodiment, an automated countershaft transmission 11 is furthermore provided so as to be connected downstream of the electric motor 5, which countershaft transmission allows the drive power provided by the internal combustion engine 3 and the electric motor 5 at a shaft 43 to be adapted in terms of rotational speed and torque to the drive output shaft 7.

The clutch device 1 has a frictional locking element 13 and a positive locking element 15 which is connected in parallel with respect to the frictional locking element 13. This will be illustrated in more detail on the basis of the following figures. The clutch device 1 with the frictional locking element 13 and the positive locking element 15 makes it possible to accelerate the internal combustion engine 3, for example from a standstill, by means of frictional locking at the frictional locking element 13. When the internal combustion engine 3 has been accelerated to a suitable rotational speed, the positive locking element 15 can be engaged for the purposes of coupling in the internal combustion engine 3 in positively locking fashion. The positive locking element 15 then also permits the transmission of high torques of the internal combustion engine 3. In this way, the frictional locking element 13 can be designed for a lower torque to be transmitted, and can advantageously be dimensioned with a small structural space requirement. Furthermore, the friction heat that is generated at the frictional locking element 13 is kept low, and it is thus in particular also the case that the region of the electric motor 5 is heated little by the frictional locking element 13.

Figure 2:
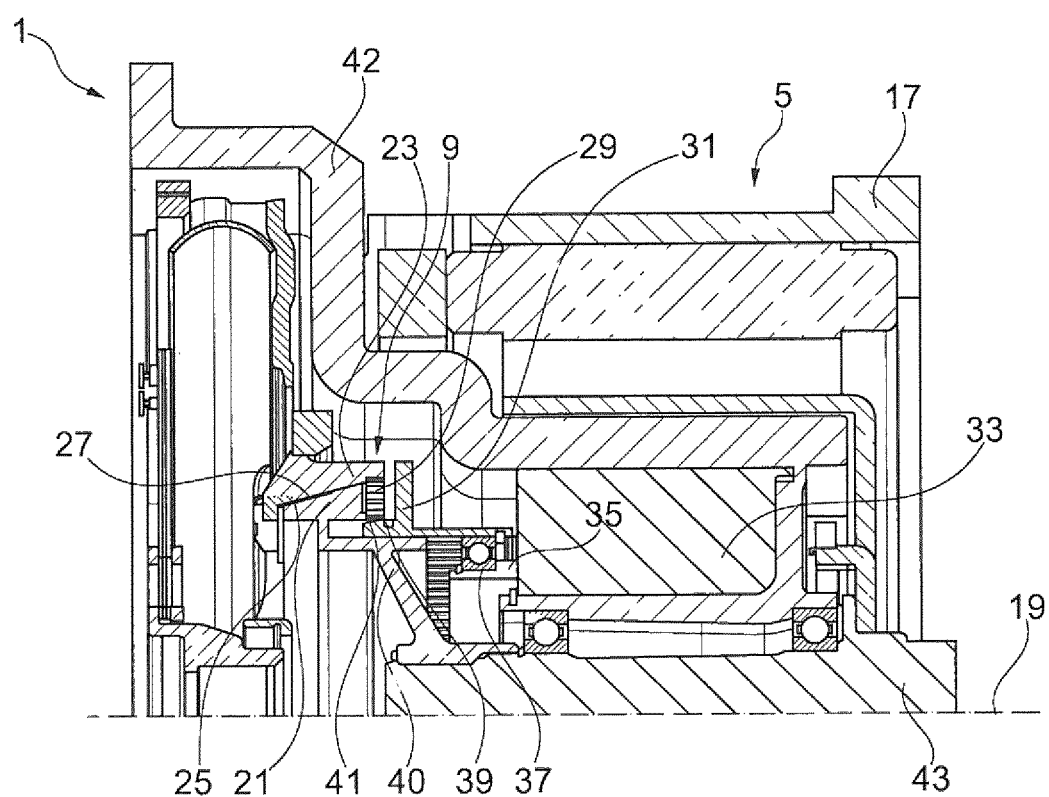
FIG. 2 shows a detail of the drive system for a hybrid vehicle as per the first exemplary embodiment in a schematic sectional illustration.

FIG. 2 shows a detail of the drive system 1 for a hybrid vehicle according to the first exemplary embodiment in a schematic sectional illustration. The illustration shows a detail, arranged above a line of symmetry 19, of the drive system 1. The line of symmetry 19 shows the axis of rotation for the overall system of a rotor 17 with a rotor carrier of the electric motor 5 and the clutch device 9. Here, the rotor 17 is also intended to encompass the rotor carrier. The clutch device 9 is illustrated in the figure below the illustrated section of the rotor 17, and accordingly runs in this case within the rotor 17 of the electric motor 5.

The clutch device 9 has a first rotary clutch element 21 and a second rotary clutch element 23 which are arranged coaxially with respect to one another and are provided so as to be displaceable toward and away from one another. An outer cone 25 is provided on the first clutch element 21, and an inner cone 27 is provided on the second clutch element 23. The arrangement of the cones 25, 27 with respect to the clutch elements 21, 23 may in this case preferably also be reversed. In the sectional illustration of FIG. 2, the first clutch element 21 can be seen obliquely to the right below the second clutch element 23. The outer cone 25 and inner cone 27 in this case run obliquely upward to the right in the figure. If the outer cone 25 and inner cone 27 are pressed against one another, it is possible for a torque to be transmitted by frictional locking via the first clutch element 21 and the second clutch element 23. Here, depending on torque and depending on pressing force, rotational slip may be possible between the two clutch elements 21, 23.

On the second rotary clutch element 23, there is provided a toothing 29. A pawl 31, which is of sleeve-shaped form in this exemplary embodiment, is provided for engaging with arresting action in the toothing 29 and for forming the positive locking between the second rotary clutch element 23 and the shaft 43. For this purpose, a sleeve 35 is arranged rotationally conjointly on the shaft 43 and is meshed with the pawl 31 at its inner diameter.

For the axial displacement of the first rotary clutch element 21 in the direction of the second rotary clutch element 23, an actuator 33 is provided. In this exemplary embodiment, the actuator 33 operates hydraulically and is capable in particular of exerting a high pressure force coaxially with respect to the first rotary clutch element 21. The force of the actuator 33 is transmitted via a provided sleeve 35 in a manner decoupled in terms of rotation by means of a provided rolling bearing 37.

In this exemplary embodiment, the pawl 31 is provided so as to engage with detent action in the presence of a defined force of the actuator 33. For this purpose, a spring element 39 is provided on the pawl 31, which spring element engages with detent action with the first rotary clutch element 21 when the pawl 31 is displaced beyond a certain position in the direction of the first rotary clutch element 21.

The drive system 1 permits a flexible transmission of the torque of an internal combustion engine 3 and of an electric motor 5 to a shaft 43 selectively by frictional locking or by positive locking. Here, the positive locking may be utilized for the high torques of the internal combustion engine 3, which permits compact dimensioning overall.

Figure 3:
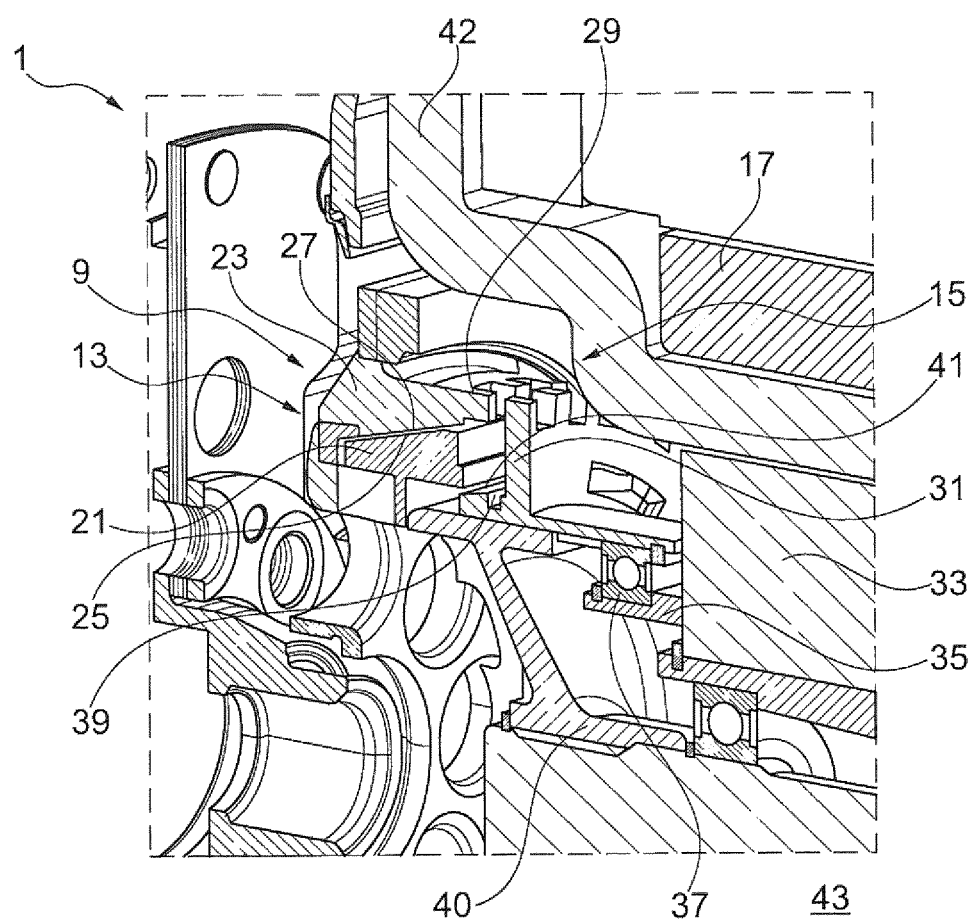
FIG. 3 shows a detail of the drive system for a hybrid vehicle as per the first exemplary embodiment in a schematic three-dimensional sectional illustration.

FIG. 3 shows a detail of the drive system 1 for a hybrid vehicle as per the first exemplary embodiment in a schematic three-dimensional sectional illustration. From the three-dimensional illustration, it is possible to more easily see, in detail, the construction of the drive system 1, in particular of the clutch device 9, which has already been presented on the basis of FIG. 2.

As in FIG. 2, the first clutch element 21 can be seen obliquely to the right below the second clutch element 23. In this illustration, it is now possible to see the toothing 29 on the right-hand edge of the second clutch element 23 in the figure. The pawl 31 is of sleeve-shaped form and can be displaced to the left in the figure, so as to enter into engagement with the clutch element 23, by the actuator 33. In this exemplary embodiment, the carrier 40 couples the pawl 31 to the shaft 43. For this purpose, the pawl 31 is meshed with the carrier 40 and the carrier 40 is coupled rotationally conjointly to the shaft 43 by means of a serrated profile. By virtue of the pawl 31 being meshed with the carrier 40, the pawl 31 can, independently of its displacement position along the carrier 40 and thus also along the shaft 43, transmit the drive torque, which is transmitted to said pawl by the second rotary clutch element 23, to the carrier 40. The first rotary clutch element 21 may likewise be coupled, for example via the carrier 40, to the shaft 43. For this purpose, it is for example possible for a frictionally locking connection to be realized by virtue of the pawl 31, which can be displaced on the carrier 40 in a so-called serrated profile, being pushed into the first rotary clutch element 21, with a clamping action being generated between the pawl 31 and the first rotary clutch element 21.

Even though the present invention has been described above on the basis of preferred exemplary embodiments, the invention is not restricted to these, but rather may be modified in a wide variety of ways.

LIST OF REFERENCE DESIGNATIONS

1 Drive system
3 Internal combustion engine
5 Electric motor
7 Drive-output shaft
9 Clutch device
11 Countershaft transmission
13 Frictional locking element
15 Positive locking element
17 Rotor
19 Line of symmetry
21 First rotary clutch element
23 Second rotary clutch element
25 Outer cone
27 Inner cone
29 Toothing
31 Pawl
33 Actuator
35 Sleeve
37 Rolling bearing
39 Spring element
40 Carrier
41 Bevel
42 Housing
43 Shaft The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive system for a hybrid vehicle, comprising:
an internal combustion engine;
an electric motor; and
a clutch device comprising a frictional locking element and a positive locking element connected in parallel with respect to the frictional locking element,
wherein the clutch device is configured to couple the internal combustion engine into the drive system and to be switched into at least the following states:
a) open positive locking element and closed frictional locking element when starting and/or synchronization of the internal combustion engine,
b) closed positive locking element and closed frictional locking element or closed positive locking element and open frictional locking element when the internal combustion engine is running and synchronized such that an internal combustion engine drive output action is generated, and
c) open positive locking element and open frictional locking element when the internal combustion engine is stopped such that purely electric motor drive of the vehicle is provided,
wherein the clutch device runs at least partially within a rotor of the electric motor.

2. The drive system as claimed in claim 1, wherein the clutch device is of dry-running design.

3. The drive system as claimed in claim 2, wherein the frictional locking element is formed with a first rotary clutch element and with a second rotary clutch element which are arranged coaxially with respect to one another and which are provided so as to be displaceable toward one another and away from one another, wherein the first rotary clutch element has an outer cone and the second rotary clutch element has an inner cone, which outer cone and inner cone are placed in contact with one another to transmit torque.

4. The drive system as claimed in claim 3, further comprising:
a toothing provided on one of the first rotary clutch element and the second rotary clutch element; and
a pawl assigned rotationally conjointly to the respective other one of the first rotary clutch element and the second rotary clutch element, wherein the pawl is configured to engage with arresting action in the toothing to provide a positive locking between the first rotary clutch element and the second rotary clutch element or between the second rotary clutch element and a shaft that is configured to transmit torque of the internal combustion engine and the electric motor.

5. The drive system as claimed in claim 1, wherein a part of the rotor of the electric motor is water-cooled.

6. The drive system as claimed in claim 5, wherein the frictional locking element is formed with a first rotary clutch element and with a second rotary clutch element which are arranged coaxially with respect to one another and which are provided so as to be displaceable toward one another and away from one another, wherein the first rotary clutch element has an outer cone and the second rotary clutch element has an inner cone, which outer cone and inner cone are placed in contact with one another to transmit torque.

7. The drive system as claimed in claim 6, further comprising:
a toothing provided on one of the first rotary clutch element and the second rotary clutch element; and
a pawl assigned rotationally conjointly to the respective other one of the first rotary clutch element and the second rotary clutch element, wherein the pawl is configured to engage with arresting action in the toothing to provide a positive locking between the first rotary clutch element and the second rotary clutch element or between the second rotary clutch element and a shaft that is configured to transmit torque of the internal combustion engine and the electric motor.

8. A method for driving the hybrid vehicle utilizing the drive system as claimed in claim 1, the method comprising the acts of:
(a) driving the hybrid vehicle by the electric motor, with transmission of a torque of the electric motor;
(b) driving the hybrid vehicle by the electric motor and simultaneously starting the internal combustion engine, with transmission of the torque by frictional locking by the frictional locking element; and
(c) driving the hybrid vehicle by the electric motor and internal combustion engine, with transmission of the torque of the internal combustion engine by positive locking by the positive locking element.

9. The method as claimed in claim 8, wherein act (b) further comprises performing an at least temporary increase in torque of the electric motor.

10. A drive system for a hybrid vehicle, comprising:
an internal combustion engine;
an electric motor; and
a clutch device comprising a frictional locking element and a positive locking element connected in parallel with respect to the frictional locking element,
wherein the clutch device is configured to couple the internal combustion engine into the drive system and to be switched into at least the following states:
a) open positive locking element and closed frictional locking element when starting and/or synchronization of the internal combustion engine,
b) closed positive locking element and closed frictional locking element or closed positive locking element and open frictional locking element when the internal combustion engine is running and synchronized such that an internal combustion engine drive output action is generated, and
c) open positive locking element and open frictional locking element when the internal combustion engine is stopped such that purely electric motor drive of the vehicle is provided,
wherein the frictional locking element is formed with a first rotary clutch element and with a second rotary clutch element which are arranged coaxially with respect to one another and which are provided so as to be displaceable toward one another and away from one another, wherein the first rotary clutch element has an outer cone and the second rotary clutch element has an inner cone, which outer cone and inner cone are placed in contact with one another to transmit torque.

11. The drive system as claimed in claim 10, further comprising:
a toothing provided on one of the first rotary clutch element and the second rotary clutch element; and
a pawl assigned rotationally conjointly to the respective other one of the first rotary clutch element and the second rotary clutch element, wherein the pawl is configured to engage with arresting action in the toothing to provide a positive locking between the first rotary clutch element and the second rotary clutch element or between the second rotary clutch element and a shaft that is configured to transmit torque of the internal combustion engine and the electric motor.

12. The drive system as claimed in claim 11, wherein the pawl is arranged to be displaceable axially parallel with respect to the first and second rotary clutch elements.

13. The drive system as claimed claim 10, further comprising an actuator configured to press the first clutch element and the second clutch element against one another.

14. The drive system as claimed in claim 13, wherein the actuator further pulls the first clutch element and the second clutch element apart from one another.

15. The drive system as claimed in claim 13, wherein the actuator is one of an electromotive actuator and a hydraulic actuator.

16. The drive system as claimed in claim 10, wherein a pawl engages with detent action in response to a defined force of the actuator or defined axial force of the first rotary clutch element or of the second rotary clutch element.

17. The drive system as claimed in claim 16, further comprising a spring element which, in response to a defined axial force being exceeded, is displaced by one of a bevel on the first rotary clutch element, a bevel on the second rotary clutch element or a displaceably arranged sleeve such that the pawl assumes a detent engagement position.

\* \* \* \* \*